US012554942B2

(12) United States Patent
Cărbune et al.

(10) Patent No.: US 12,554,942 B2
(45) Date of Patent: Feb. 17, 2026

(54) LARGE LANGUAGE MODEL-BASED RESPONSES TO TARGETED UI ELEMENTS

(71) Applicant: Google LLC, Mountain View, CA (US)

(72) Inventors: Victor Cărbune, Zurich (CH); Ondrej Škopek, Zurich (CH)

(73) Assignee: Google LLC, Mountain View, CA (US)

(*) Notice: Subject to any disclaimer, the term of this patent is extended or adjusted under 35 U.S.C. 154(b) by 106 days.

(21) Appl. No.: 18/480,728

(22) Filed: Oct. 4, 2023

(65) Prior Publication Data
US 2025/0117594 A1    Apr. 10, 2025

(51) Int. Cl.
| | | |
|---|---|---|
| *G06F 40/40* | (2020.01) | |
| *G06F 3/0484* | (2022.01) | |
| *G06F 16/957* | (2019.01) | |
| *G06F 40/109* | (2020.01) | |
| *G06F 40/169* | (2020.01) | |
| *G06N 3/0475* | (2023.01) | |
| *G06N 20/00* | (2019.01) | |

(52) U.S. Cl.
CPC ............ *G06F 40/40* (2020.01); *G06F 3/0484* (2013.01); *G06F 16/957* (2019.01); *G06F 40/109* (2020.01); *G06F 40/169* (2020.01); *G06N 3/0475* (2023.01); *G06N 20/00* (2019.01)

(58) Field of Classification Search
CPC ...... G06F 40/169; G06F 40/40; G06F 3/0483; G06F 3/0484; G06F 40/109; G06F 8/38; G06F 9/4451; G06F 9/451; G06F 16/957; G06N 20/00; G06N 3/0475
See application file for complete search history.

(56) References Cited

U.S. PATENT DOCUMENTS

| | | | |
|---|---|---|---|
| 10,963,937 B1 | 3/2021 | Le Chevalier et al. | |
| 11,443,208 B2* | 9/2022 | Thatcher | ............... H04L 51/224 |
| 11,941,052 B2* | 3/2024 | Martinec | ............. G06F 16/9032 |

(Continued)

FOREIGN PATENT DOCUMENTS

| | | |
|---|---|---|
| JP | 2011029864 A | 2/2011 |
| JP | 2021504861 A | 2/2021 |

(Continued)

OTHER PUBLICATIONS

Damian, et al., "Finding Duplicate Offers in the Online Marketplace Catalogue Using Transformer Based Methods", CLNS—Cloud and Netowrk Infrastructure, EIT Digital, https://kth.diva-portal.org/smash/get/diva2:1704885/FULLTEXT01.pdf, Jun. 26, 2022, 88 pages.

(Continued)

*Primary Examiner* — Nicholas Ulrich
(74) *Attorney, Agent, or Firm* — Brake Hughes Bellermann LLP

(57) ABSTRACT

Techniques include using a generative model to make changes to content such that the mechanisms used to guide the user into a decision become plain to the user and/or minimizes the perceived urgency. Implementations can operate as part of the browser or as an extension to the browser. Implementations may identify a targeted UI element in browser content (a web page) and use the generative model to modify the targeted UI element before presenting the browser content to the user. In some implementations, the identification of the targeted UI element may be performed by the generative model.

23 Claims, 9 Drawing Sheets

(56) References Cited

U.S. PATENT DOCUMENTS

| | | | |
|---|---|---|---|
| 12,170,641 B2* | 12/2024 | Bradley | ............... H04L 51/224 |
| 2015/0293897 A1 | 10/2015 | Myslinski | |
| 2019/0147288 A1 | 5/2019 | Gupta et al. | |
| 2019/0347287 A1* | 11/2019 | Crossno | ................ G06N 20/00 |
| 2020/0034465 A1* | 1/2020 | Brake | ................ G06F 16/3323 |
| 2021/0240319 A1 | 8/2021 | Schoppe et al. | |
| 2022/0300517 A1* | 9/2022 | Baughman | .......... G06F 16/2246 |

FOREIGN PATENT DOCUMENTS

| | | |
|---|---|---|
| WO | 2016067410 A1 | 5/2016 |
| WO | 2019106659 A1 | 6/2019 |

OTHER PUBLICATIONS

Goutham, "High-Quality Sentence Paraphraser Using Transformers in NLP", retrieved on May 3, 2023, from https://towardsdatascience.com/high-quality-sentence-paraphraser-using-transformers-in-nlp-c33f4482856f, Sep. 21, 2021, 5 pages.

Mathur, et al., "Dark Patterns at Scale: Findings From a Crawl of 11K Shopping Websites", arXiv:1907.07032v2, Proc. ACM Hum.-Comput. Interact., vol. 3, No. CSCW, Article 81, Nov. 2019, pp. 81:1-81:32.

Obie, et al., "Automated Detection, Categorisation and Developers' Experience With the Violations of Honesty in Mobile Apps", arXiv:2211.07142v1, Nov. 14, 2022, 47 pages.

Yada, et al., "Dark Patterns in E-Commerce: A Dataset and Its Baseline Evaluations", arXiv:2211.06543v1, Nov. 12, 2022, 8 pages.

Office Action for Japanese Application No. 2024-174338 (with English translation), dated Nov. 18, 2025, 6 pages.

* cited by examiner

LARGE LANGUAGE MODEL-BASED RESPONSES TO TARGETED UI ELEMENTS

BACKGROUND

Some websites include user interface elements that attempt to induce a user to perform a desired action. Some of those inducements include user interface elements that include formatting and/or text to encourage the desired action.

SUMMARY

Implementations described herein are related to generating responses to targeted UI elements. The targeted UI elements may appear in a website, via an email, or through any other electronic communication. The purpose of such targeted UI elements is to convince a user to take a particular action that the user may not take without such targeted UI elements. For example, a targeted UI element may urge a user to initiate installation of an app or take action on an object based on a statement or implication of scarcity. Such a targeted UI element puts pressure on the user, leading to actions performed within the browser that would not normally have been performed without the presence of the targeted UI element. An improvement involves training a generative model such as a large language model (LLM) and multi-modal models (including joint modalities with text and image, video, audio, etc.) to recognize targeted UI elements and generate responses to such targeted UI elements. For example, when a user expresses interest in an object by clicking on a hyperlink in a website in a browser on a computer, implementations are configured to detect targeted UI elements in a portion of first content received from the website as a result of clicking on the hyperlink. In some implementations, the computer then sends the first portion of the content to a generative model such as an LLM, which is trained to generate responses to targeted UI elements. The computer then receives a second content including a response to the targeted UI element from the generative model and displays the response. In some implementations, the generative model receives the first content, identifies a targeted UI element, and generates responses to the identified targeted UI element. In some implementations, the response includes an annotation to the first content. For example, in response to an urging to purchase a hotel room because such rooms are 90% booked, the second content may state that "statements of a room being almost booked may or may not be true but is a tactic to get you to purchase more quickly." In some implementations, the response includes a change to the text of the first content. In some implementations, the response includes a change of font, color, or emphasis.

In one general aspect, a computer program product comprises a non-transitory storage medium, the computer program product including code that, when executed by processing circuitry of a computing device, causes the processing circuitry to perform a method. The method can include receiving first content from a first remote web server in response to a request for the first content. The method can also include detecting, within a portion of the first content, a targeted user interface (UI) element. The method can further include, in response to detecting the targeted UI element, sending at least the portion of the first content to a generative model. The method can further include receiving second content from the generative model, the second content including a difference from the portion of the first content, the difference being based on a type of the targeted UI element. The method can further include initiating display of the first content with the first portion updated with the second content on a display device.

In another general aspect, a computer program product comprises a non-transitory storage medium, the computer program product including code that, when executed by processing circuitry of a computing device, causes the processing circuitry to perform a method. The method can include receiving first content from a remote web server via a client device, the client device being configured to detect a targeted user interface (UI) element in the first content. The method can also include generating second content using the generative model, the second content including a difference from the first content, the difference being based on the targeted UI element. The method can further include sending the second content to the client device for display on a display device of the client device.

In another general aspect, a method can include receiving first content from a first remote web server in response to a request for the first content. The method can also include detecting, within a portion of the first content, a targeted user interface (UI) element. The method can further include, in response to detecting the targeted UI element, sending at least the portion of the first content to a generative model. The method can further include receiving second content from the generative model, the second content including a difference from the portion of the first content, the difference being based on a type of the targeted UI element. The method can further include initiating display of the first content with the first portion updated with the second content on a display device.

In another general aspect, an electronic apparatus comprises memory and processing circuitry coupled to the memory. The processing circuitry can be configured to receive first content from a first remote web server in response to a request for the first content. The processing circuitry can also be configured to detect, within a portion of the first content, a targeted user interface (UI) element. The processing circuitry can further be configured to, in response to detecting the targeted UI element, send at least the portion of the first content to a generative model. The processing circuitry can further be configured to receive second content from the second remote web server, the second content including a difference from the portion of the first content, the difference being based on the type of targeted UI element. The processing circuitry can further be configured to initiate display of the first content with the first portion updated with the second content on a display device.

The details of one or more implementations are set forth in the accompanying drawings and the description below. Other features will be apparent from the description and drawings, and from the claims.

DETAILED DESCRIPTION

Figure 1:
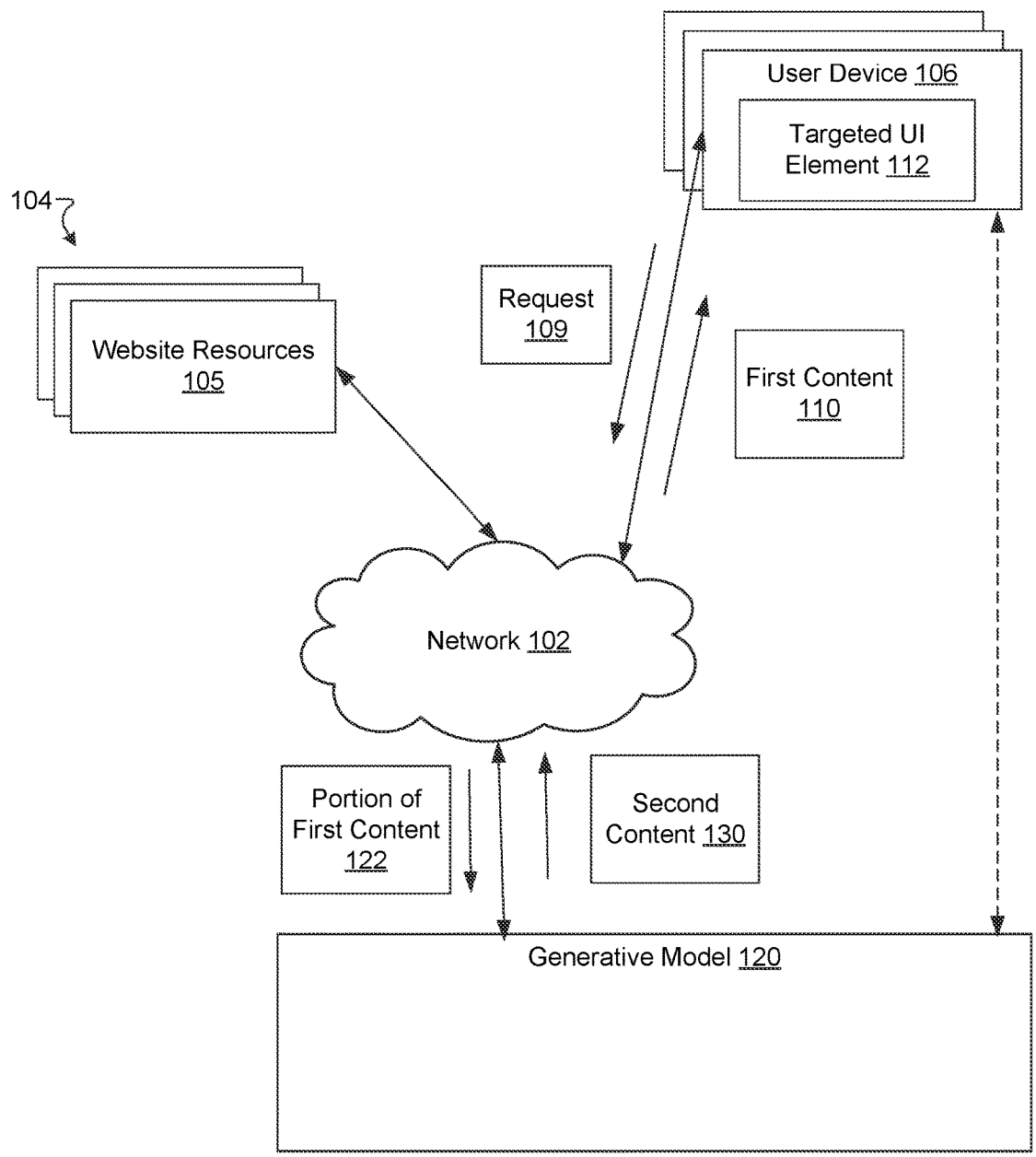
FIG. 1 is a diagram that illustrates an example network environment in which improved techniques described herein may be implemented.

Websites, apps, and generally any e-commerce providers have a goal of convincing users to commit to acting on offered products quickly and frequently. Such a goal may be achieved through any or a combination of special user interface (UI) affordances or targeted UI elements that create an illusion of urgency (e.g., "80% of our inventory is gone!"). The mechanisms employed can be as simple as modifying the positioning of an ad or changing colors or fonts, or as complex as using specific wording repeatedly to create a false sense of limited availability.

A technical problem with the above is that it is not clear how a browser should mitigate interactions with a targeted UI element. For example, a user of the browser may not be aware that they are being guided by an unseen hand to make a predetermined decision. In that case, the user may end up making purchasing decisions that are not based on fact but rather on the illusion of urgency created by the targeted UI elements.

In accordance with the implementations described herein, a technical solution to the above-described technical problem includes an improved browser, app, or other interface that automatically mitigates interactions with a targeted UI element. Such an interface uses a generative model to make changes to content such that the mechanisms used to guide the user into a decision become plain to the user and/or minimizes the perceived urgency. Implementations can operate as part of the browser or as an extension to the browser. Implementations may identify a targeted UI element in browser content (a web page) and use the generative model to modify the targeted UI element before presenting the browser content to the user. In some implementations, the identification of the targeted UI element may be performed by the generative model.

In an example, when a client computer requests and receives content, the client computer may detect a predetermined pattern representative of a targeted UI element. Upon detection of such an element, the client computer may provide the content to a generative model. The generative model may be executed on the client device or on a remote server. The generative model then modifies the targeted UI element. This can include replacing the targeted UI element with new content. The new content can include annotations that, e.g., explain that a message in the targeted UI element is designed to get the user to make a purchasing decision more quickly. The modification can also include different colors, fonts, and/or emphases, wholesale changes or deletions of text, graphics, audio, video, or tactile functions. With user permission, the generative model can produce different content for different users, based on user history.

For example, the generative model may use examples of past user behavior to determine changes the user is most likely to respond to, which types (categories) of content with which the user may engage. In some implementations, an observation period may be used with user permission to determine which types of targeted UI affordances a user is likely to select, and which the user is not. This may be used to trigger modifications personalized for the user.

The generative model can be fine tuned (trained) to recognize which portions of the content represent the targeted UI element that needs to be modified. This may be done, for example, with example content from the Internet labeled with "modify" or "don't modify" labels.

A technical advantage of disclosed implementations is that a user is less likely to make decisions based on pressure tactics such as targeted UI elements. That is, the generative model can make clear to the user which portions of the content are using manipulative words, expressions, colors, etc. In this way, the user becomes aware of the invisible hand guiding them toward or away from a decision and is accordingly better equipped to make a decision based on factual information.

FIG. 1 depicts an example environment 100 in which users can interact with one or more websites that are controlled from remote servers. In some implementations, the websites offer products that may be purchased by a user via a user device 106. In some cases, the products may be of limited inventory, such as flights, hotel rooms, event tickets, and the like.

With continued reference to FIG. 1, the example environment 100 includes a network 102, e.g., a local area network (LAN), wide area network (WAN), the Internet, or a combination thereof, connects web sites 104, user devices 106, and the generative model 120. In some examples, the network 102 can be accessed over a wired and/or a wireless communications link. For example, mobile computing devices, such as smartphones can utilize a cellular network to access the network. The environment 100 may include millions of web sites 104 and user devices 106.

In some examples, a web site 104 is provided as one or more resources 105 associated with a domain name and hosted by one or more servers. An example web site is a collection of web pages formatted in an appropriate machine-readable language, e.g., hypertext markup language (HTML), that can contain text, images, multimedia content, and programming elements, e.g., scripts. Each web site 104 is maintained by a publisher, e.g., an entity that manages and/or owns the web site. Web site resources 105 can be static or dynamic.

In some examples, a resource 105 is data provided over the network 102 and that is associated with a resource address, e.g., a uniform resource locator (URL). In some examples, resources 105 that can be provided by a web site 104 include web pages, word processing documents, and portable document format (PDF) documents, images, video, and feed sources, among other appropriate digital content. The resources 105 can include content, e.g., words, phrases, images and sounds and may include embedded information, e.g., meta information and hyperlinks, and/or embedded instructions, e.g., scripts.

In some examples, a user device 106 is an electronic device that is under control of a user and is capable of requesting and receiving resources 105 over the network 102. Example user devices 106 include personal computers, mobile computing devices, e.g., smartphones, wearable devices, and/or tablet computing devices that can send and receive data over the network 102. As used throughout this document, the term mobile computing device ("mobile device") refers to a user device that is configured to communicate over a mobile communications network. A smartphone, e.g., a phone that is enabled to communicate over the Internet, is an example of a mobile device, as are wearables and other smart devices such as smart speakers. A user device 106 typically includes a user application, e.g., a web browser, to facilitate the sending and receiving of data over the network 102.

A user device 106 submits a request 109 for content at a URL. In some examples, the user device 106 can include one or more input modalities. Example modalities can include a keyboard, a touchscreen, and/or a microphone. For example, a user can use a keyboard and/or touchscreen to type in a URL. In some implementations, the user can generate a URL via a search query to a search system.

In response, the user device 106 receives first content 110. The first content 110 can include text, graphics, audio, video, tactile content, or the like. The first content 110 can be transmitted to the user device 106 in a coded format such as HTML, XML, javascript, or the like. In some implementations, the first content 110 takes the form of a document object model (DOM) of UI elements for, e.g., a mobile app when the user device 106 is a mobile device.

Upon receiving first content 110, the user device 106 scans the first content 110 to determine whether there are any targeted UI elements in the first content 110. In some implementations, the user device 106 uses a lookup table (LUT) of known targeted UI elements to determine whether there are any targeted UI elements. For example, a LUT can include a list of known words, phrases, clauses, sentences, graphics, color schemes, etc., that are known to promote a sense of urgency in the user.

In some implementations, the user device 106 uses a model trained to identify targeted UI elements in content to evaluate the first content. In some implementations, the model is a neural network. In some implementations, the neural network is supervised and is trained using known words, phrases, clauses, sentences, graphics, color schemes, etc., that are known to promote/convey a sense of urgency in the user. In such implementations, the first content may be provided to the model and the model may provide a result indicating that the first content includes a targeted UI element. In some implementations, the result may include an identification of the portion. The identification can be an object identifier (e.g., a DOM node identifier, an accessibility tree identifier), the text or a subset of the text (e.g., a predetermined number of characters from the text) in the portion, etc.

In some implementations, at this point the user device 106 displays the first content 110 on a display device in a browser window. It is noted that, while FIG. 1 is directed to a scenario in which the user device accesses a web site 104, there are other means of obtaining the first content 110. For example, in some implementations the first content 110 is obtained via an email program and is viewed in an email window.

If a targeted UI element 112 is detected in a portion of the first content 122, the user device 106 sends the portion of the first content 122 to a generative model 120. As shown in FIG. 1, the generative model 120 runs on a remote server and is accessed via the network 102. Nevertheless, in some implementations in which the generative model 120 is small enough to run on the user device 106, the generative model is local to the user device 106.

In some implementations, the generative model 120 includes a large language model (LLM). A LLM is a probabilistic model of natural language that generates probabilities of a series of words based on text corpora on which it is trained. As a typical LLM is trained on the Internet, such a LLM tends to be large enough that they reside on a separate server or servers. In some cases, however, a LLM specialized for particular tasks may be small enough to reside on the user device 106. In some implementations, the generative model 120 may be an LLM specialized to identify and modify targeted UI elements, such as targeted UI element 112.

In some implementations, with user permission, the generative model 120 may be fine-tuned to account for behavior of the user. For example, in addition to recognizing targeted UI elements such as targeted UI element 112, the generative model 120 be fine-tuned to generate a response to the targeted UI element based on the user's past behavior (i.e., a user history) in response to such targeted UI elements. For example, while a first user reacts to urgent language in a targeted UI element by predictably making a purchase, a second user reacts to the same urgent language by ending the transaction without making a purchase. Accordingly, training data for the first user may involve stronger changes to the website display than for the second user. For example, training data for the first user may involve an annotation or a wholesale change to the targeted UI element, while training data for the second user may involve no change at all.

In implementations that include modifications fine-tuned (personalized) for the user, the user may be provided with controls allowing the user to make an election as to both if and when the environment 100 and/or the user device 106 may enable the collection of user history and/or whether user history can be used in training the generative model 120 and/or in obtaining a response from the generative model 120. Thus, implementations provide the user with control over what information is collected, how that information is used, and what information is provided to the user.

The generative model 120, upon receiving the portion of first content 122, generates a response to the targeted UI element 112 in the portion of the first content 122 as second content 130. The second content 130 includes a difference from the portion of the first content 122. The difference from the first portion of the content is based on a type of the targeted UI element 112. The type of targeted UI element can include a text type, an emphasis type, a color type, a font type, a graphic type, an audio type, a video type, or a tactile type.

The second content 130 is, in some implementations, a replacement for the portion of the first content 122. In some implementations, the second content 130 is an addition to the portion of the first content 122. For example, in some implementations, the second content 130 includes an annotation to the portion of the first content 122. In some implementations, the second content 130 includes a change of color, font, or emphasis to text. In some implementations, the second content 130 includes graphics, audio, video, or UI affordances.

Once the second content 130 has been generated, the second content 130 is sent to the user device 106 for display as an update to the first portion 110. In some implementations where the generative model 120 resides on a remote server, the remote server sends the second content 130 to the user device 106 via the network 102. In some implementations where the generative model 120 resides locally on the user device 106, the second content 130 is sent to a location in memory where it may be accessed by, e.g., a web browser, an email program, or the like. In either case, display of the portion of the first content 122 updated with the second content 130 is initiated once the second content 130 is received by the user device 106.

Figure 2A:
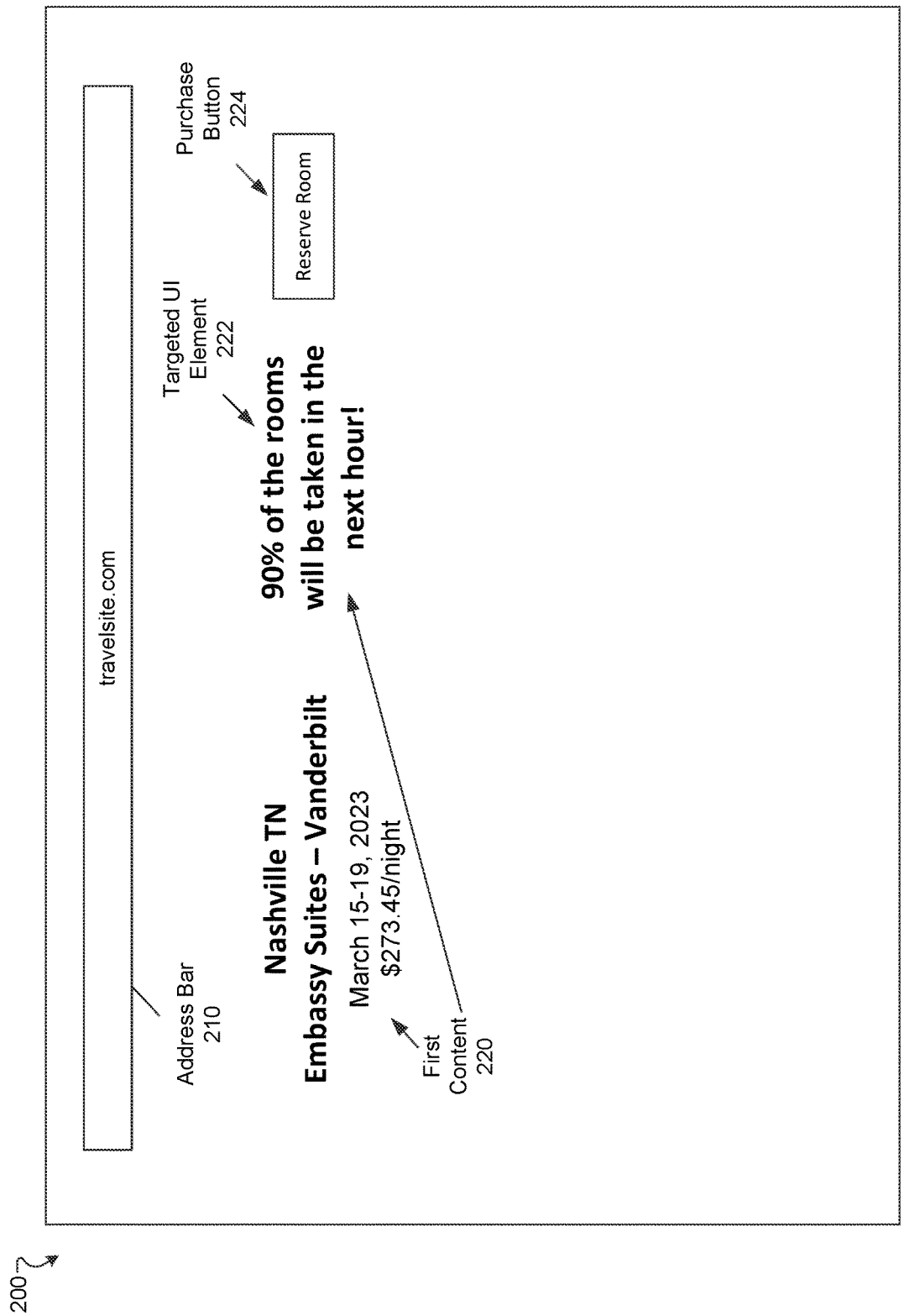
FIG. 2A is a diagram that illustrates an example first content with a targeted UI element.

FIG. 2A is a diagram that illustrates an example first content 220 with a targeted UI element 222 and second content 230 with a response. In this example, the browser window 200 includes an address bar 210 that indicates the current website address as "travelsite.com." As shown in FIG. 2A, the browser window 200 displays first content 220 which includes a result of a search for a hotel room in Nashville TN, listing requested dates and a resulting price per night.

As shown in FIG. 2A, the first content 220 also includes a targeted UI element 222, which includes text that is classified as conveying urgency, imploring the user to reserve the room, e.g., make the purchasing decision, soon. The targeted UI element 222 is shown in a bold font. In some implementations, it may also be in a particular color (e.g., red) that is designed to draw the attention of the user. The targeted UI element 222 may also have the text flashing on and off to further draw the attention of the user. Moreover, the targeted UI element 222 is situated next to a purchase button 224 that would indicate the user's desire to reserve the room.

Figure 2B:
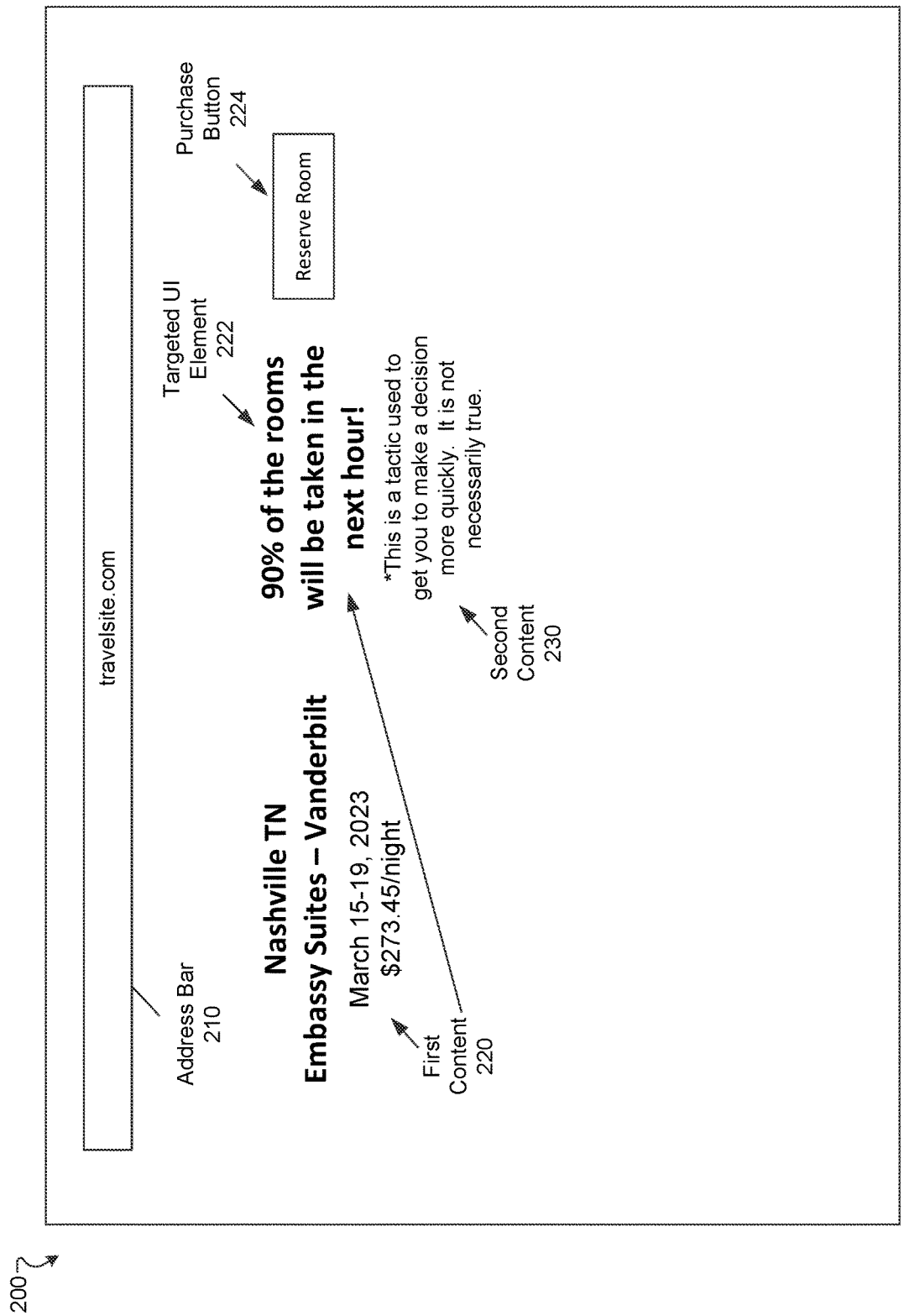
FIG. 2B is a diagram that illustrates an example first content with a targeted UI element and second content with a response.

FIG. 2B shows a response to the first content 220 containing the targeted UI element 222, a generative model (e.g., generative model 120 of FIG. 1) generates second content 230. As shown in FIG. 2B, the second content 230 takes the form of an annotation to the targeted UI element 222 and is placed immediately next to or underneath the targeted UI element 222.

In some implementations, the second content 230 is displayed in browser window 200 after the first content 220 has already been displayed in browser window 200. A reason for this is that the generative model may take some time to generate the second content 230, which may be longer than the user is willing to wait for content to be displayed in the browser window 200.

Figure 2C:
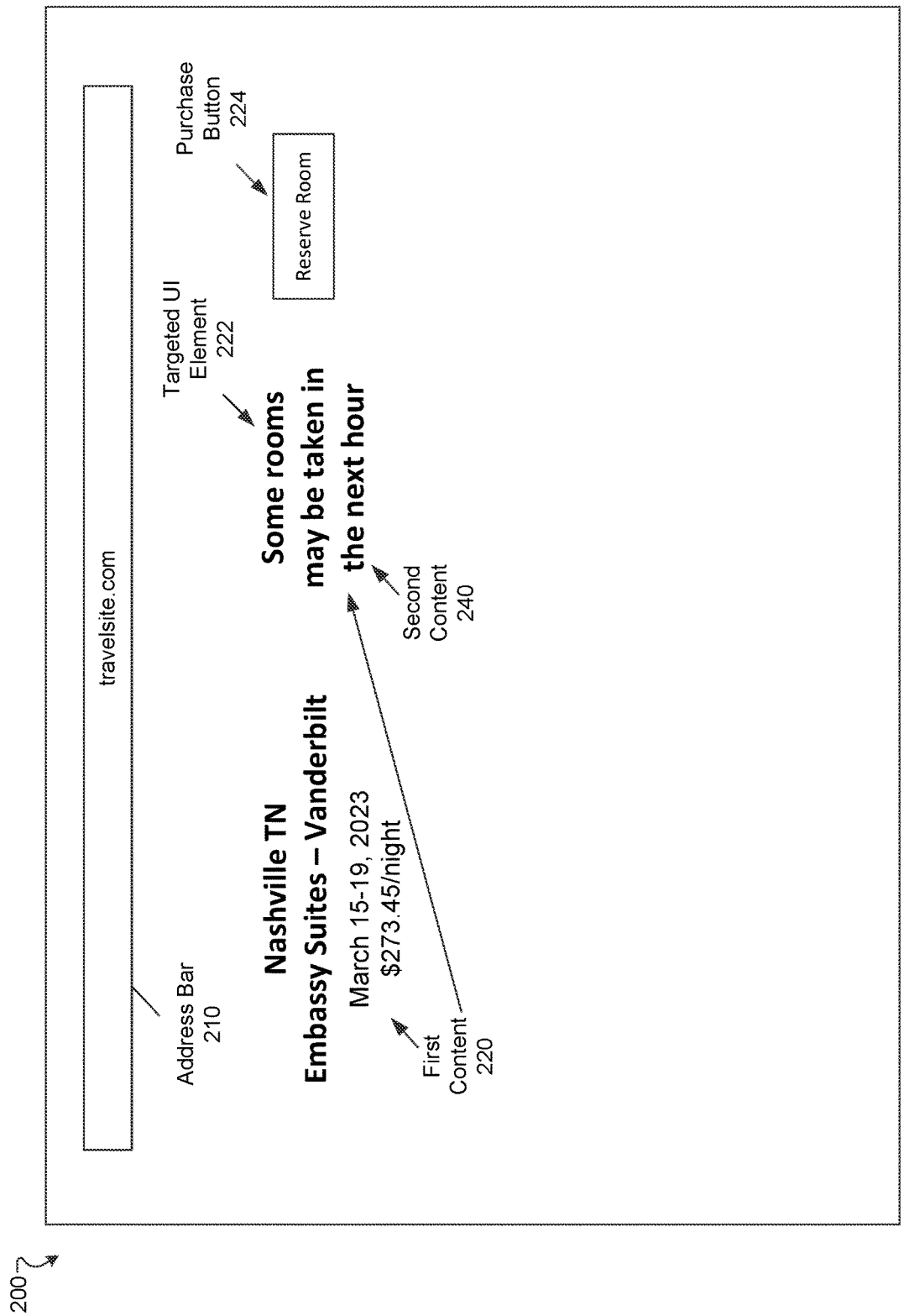
FIG. 2C is a diagram that illustrates an example first content with a targeted UI element and second content with a response.

FIG. 2B shows the second content 230 in the form of an annotation to the first content 220, in particular the targeted UI element 222. The improvement described herein is not limited to such annotations and can take any of a number of forms. For example, instead of or in addition to the annotation shown in FIG. 2B, FIG. 2C shows second content 240 that takes the form of an edit to the targeted UI element 222. In the case shown in FIG. 2C, the targeted UI element "90% of the rooms will be taken in the next hour!" is replaced with "Some rooms may be taken in the next hour"

Figure 2D:
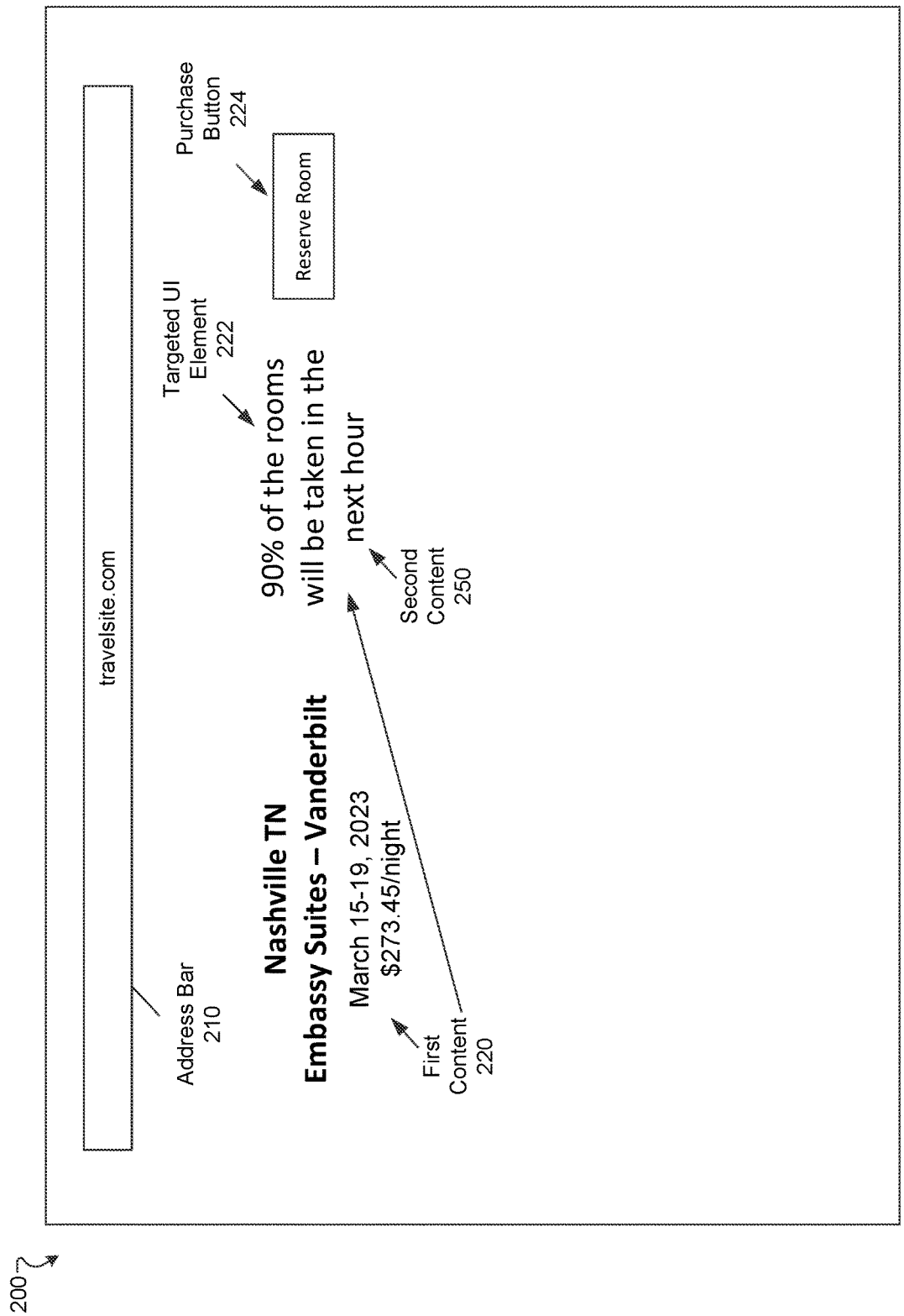
FIG. 2D is a diagram that illustrates an example first content with a targeted UI element and second content with a response.

FIG. 2D shows second content 250 in the form of a change in emphasis (e.g., removing the bold and exclamation point). Other changes can include a change in placement within the browser window, a change in color, or a wholesale deletion of the targeted UI element 222.

FIGS. 2A-2D also show a response to the targeted UI element 222 being shown within a browser window. Such a response may be generated for any program that runs on a user device (e.g., user device 106 of FIG. 1) in which targeted UI elements may be displayed. In some implementations, the second content 230, 240, or 250 is generated for an email that displays the first content 220 within an email window, including a preview mode.

Figure 3:
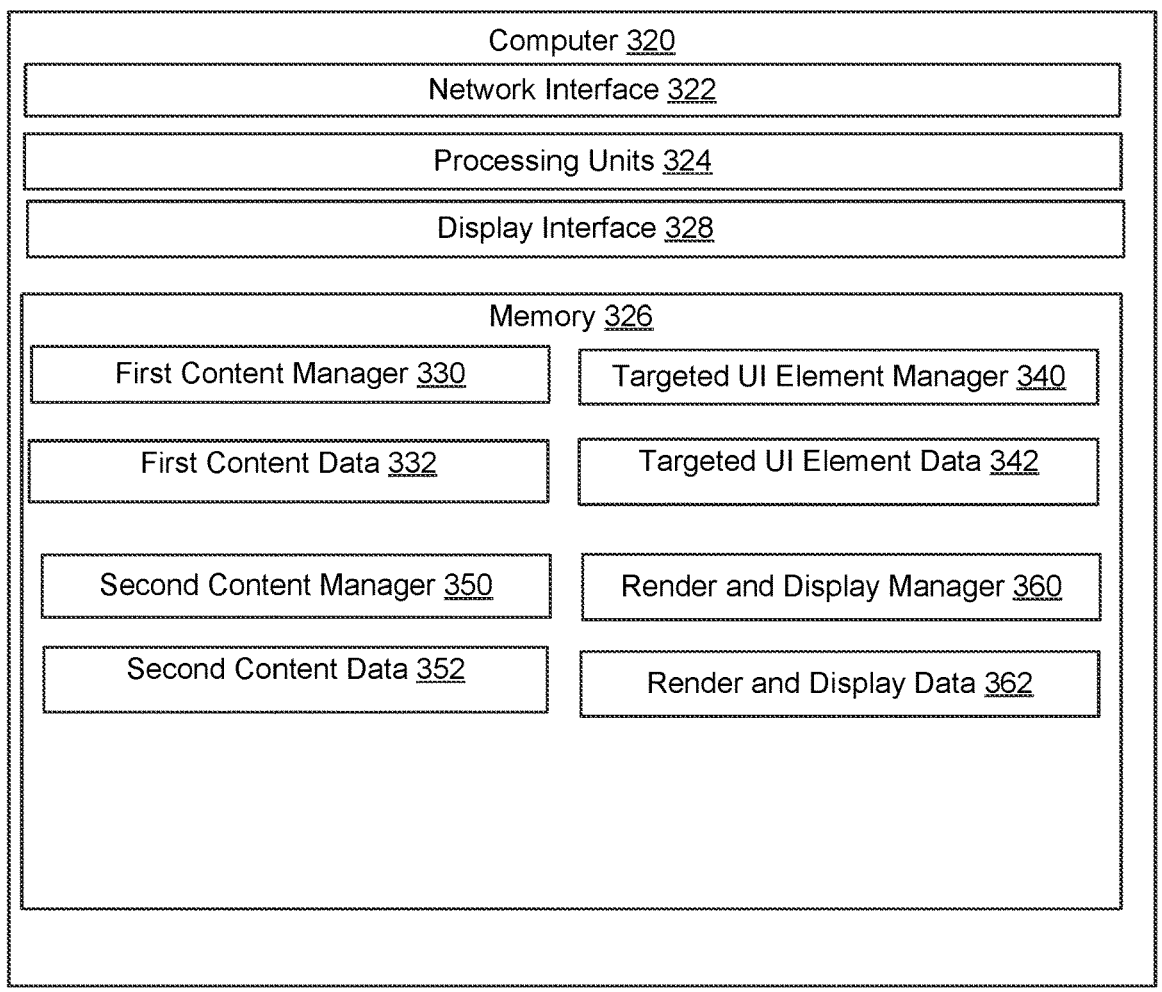
FIG. 3 is a diagram that illustrates an example electronic environment in which the improved techniques described herein may be implemented.

FIG. 3 is a diagram that illustrates an example electronic apparatus in which the above-described technical solution may be implemented. A computer 320 is configured to cause responses to targeted UI elements to be generated and displayed on a display device.

The computer 320 includes a network interface 322, one or more processing units 324, memory 326, and a display interface 328. The network interface 322 includes, for example, Ethernet adaptors, Token Ring adaptors, and the like, for converting electronic and/or optical signals received from the network to electronic form for use by the computer 320. The set of processing units 324 include one or more processing chips and/or assemblies. The memory 326 includes both volatile memory (e.g., RAM) and non-volatile (nontransitory) memory, such as one or more ROMs, disk drives, solid state drives, and the like. The set of processing units 324 and the memory 326 together form processing circuitry, which is configured and arranged to carry out various methods and functions as described herein. The display interface 328 is configured to provide data to a display device for rendering and display to a user.

In some implementations, one or more of the components of the computer 320 can be, or can include processors (e.g., processing units 324) configured to process instructions stored in the memory 326. Examples of such instructions as depicted in FIG. 3 include a content manager 330, a targeted UI element manager 340, a second content manager 350, and a render and display manager 360. Further, as illustrated in FIG. 3, the memory 326 is configured to store various data, which is described with respect to the respective managers that use such data.

The first content manager 330 is configured to request first content from a first remote web server over a network. The first content manager 330 is also configured to receive first content from the first remote web server over the network as first content data 332. In some implementations, first content data 332 is in the form of HTML code, which is rendered and displayed on a display device within a browser window by the render and display manager 360.

The targeted UI element manager 340 is configured to detect a targeted UI element within a portion of the first content, the portion of the first content being the targeted UI element data 342. In some implementations, the targeted UI element manager 340 uses a lookup table (LUT) to determine whether there is a targeted UI element within the portion of the first content. In some implementations, the targeted UI element manager 340 uses a model trained to identify targeted UI elements in content to evaluate the first content. For example, the model may be a supervised neural network that is trained using a dataset of known targeted UI elements.

The second content manager 350 is configured to send the portion of the first content, e.g., targeted UI element data 342, to a generative model. The generative model, in some implementations, resides on a second remote server accessible over a network. In some implementations, the generative model resides on the computer 320. In such implementations, for the generative model to reside on the computer 320, the generative model is small and configured for specialized tasks.

The generative model is configured to generate second content in response to the targeted UI element data 342. In some implementations, the generative model includes a large language model (LLM). In some implementations, the generative model is trained to generate the second content and modify the first content by updating the targeted UI element data 342 using the second content in response to identifying the targeted UI element.

The second content manager 350 is also configured to receive, as second content data 352, the second content generated by the generative model. The second content data 352 includes a difference from the targeted UI element data 342, e.g., a difference from the portion of the first content. The difference from the first portion of the content is based on a type of the targeted UI element. For example, when the type of targeted UI element is textual, the difference will be textual.

The render and display manager 360 is configured to initiate display of the first content data 332 with the portion of the first content—the targeted UI element data 342—updated with the second content data 352 on a display device. The render and display data 362 includes the first content data 332 with the targeted UI element data 342 updated with the second content data 352.

The components (e.g., modules, processing units 324) of the computer 320 can be configured to operate based on one or more platforms (e.g., one or more similar or different platforms) that can include one or more types of hardware, software, firmware, operating systems, runtime libraries, and/or so forth. In some implementations, the components of the computer 320 can be configured to operate within a cluster of devices (e.g., a server farm). In such an implementation, the functionality and processing of the components of the computer 320 can be distributed to several devices of the cluster of devices.

The components of the computer 320 can be, or can include, any type of hardware and/or software configured to process attributes. In some implementations, one or more portions of the components shown in the components of the computer 320 in FIG. 3 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 320 can be, or can include, a software module configured for execution by at least one processor (not shown). In some implementations, the functionality of the components can be included in different modules and/or different components than those shown in FIG. 3, including combining functionality illustrated as two components into a single component.

Although not shown, in some implementations, the components of the computer 320 (or portions thereof) can be configured to operate within, for example, a data center (e.g., a cloud computing environment), a computer system, one or more server/host devices, and/or so forth. In some implementations, the components of the computer 320 (or portions thereof) can be configured to operate within a network. Thus, the components of the computer 320 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, the memory 326 can be any type of memory such as a random-access memory, a disk drive memory, flash memory, and/or so forth. In some implementations, the memory 326 can be implemented as more than one memory component (e.g., more than one RAM component or disk drive memory) associated with the components of the computer 320. In some implementations, the memory 326 can be a database memory. In some implementations, the memory 326 can be, or can include, a non-local memory. For example, the memory 326 can be, or can include, a memory shared by multiple devices (not shown). In some implementations, the memory 326 can be associated with a server device (not shown) within a network and configured to serve the components of the computer 320. As illustrated in FIG. 3, the memory 326 is configured to store various data, including first content data 332, targeted UI element data 342, second content data 352, and render and display data 362.

Figure 4:
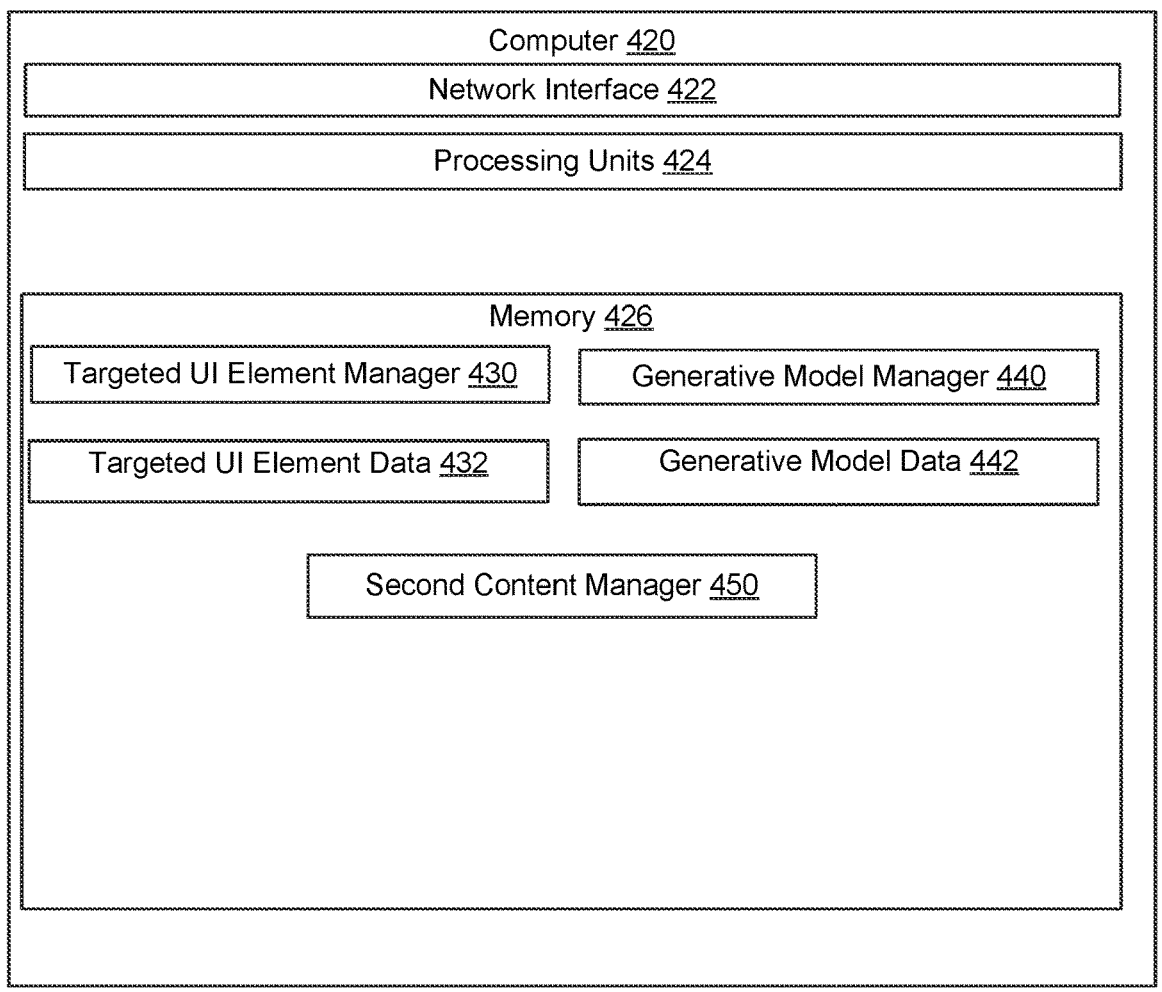
FIG. 4 is a diagram that illustrates an example electronic environment in which the improved techniques described herein may be implemented.

FIG. 4 is a diagram that illustrates an example electronic apparatus in which the above-described technical solution may be implemented. A computer 420 is configured to generate responses to targeted UI elements. In some implementations, the computer 420 is in communication with a user device over a network. In some implementations, the computer 420 is the user device.

The computer 420 includes a network interface 422, one or more processing units 424, and memory 426. The network interface 422 includes, for example, Ethernet adaptors, Token Ring adaptors, and the like, for converting electronic and/or optical signals received from the network to electronic form for use by the computer 420. The set of processing units 424 include one or more processing chips and/or assemblies. The memory 426 includes both volatile memory (e.g., RAM) and non-volatile (nontransitory) memory, such as one or more ROMs, disk drives, solid state drives, and the like. The set of processing units 424 and the memory 426 together form processing circuitry, which is configured and arranged to carry out various methods and functions as described herein.

In some implementations, one or more of the components of the computer 420 can be, or can include processors (e.g., processing units 424) configured to process instructions stored in the memory 426. Examples of such instructions as depicted in FIG. 4 include a targeted UI element manager 430, a generative model manager 440, and a second content manager 450. Further, as illustrated in FIG. 4, the memory 426 is configured to store various data, which is described with respect to the respective managers that use such data.

The targeted UI element manager 430 is configured to receive targeted UI element data 432, which represents at least one targeted UI element. The targeted UI element data 432 may also represent additional content in which the at least one targeted UI element is included. The additional content makes up a portion of first content that is received by a user device in response to a request for the first content and is provided by a website over a network.

In some implementations, the targeted UI element data 432 is received over a network. In such implementations, the computer 420 on which the generative model is run is remote from the computer that received the targeted UI element from the website.

The generative model manager 440 is configured to generate, as generative model data 442, second content in response to the targeted UI element in the targeted UI element data 432. In some implementations, the generative model includes a large language model (LLM). In some implementations, the generative model is trained to generate second content and modify the targeted UI element data 342 by updating the targeted UI element data 342 using the second content in response to identifying the targeted UI element.

The second content manager 450 is configured to send the second content, e.g., the generative model data 442, to the computer that received the targeted UI element from the website. In some implementations in which the computer 420 on which the generative model is run is remote from the computer that received the targeted UI element from the website, the second content manager 450 sends the second content over a network.

The components (e.g., modules, processing units 424) of the computer 320 can be configured to operate based on one or more platforms (e.g., one or more similar or different platforms) that can include one or more types of hardware, software, firmware, operating systems, runtime libraries, and/or so forth. In some implementations, the components of the computer 420 can be configured to operate within a cluster of devices (e.g., a server farm). In such an implementation, the functionality and processing of the components of the computer 420 can be distributed to several devices of the cluster of devices.

The components of the computer 420 can be, or can include, any type of hardware and/or software configured to process attributes. In some implementations, one or more portions of the components shown in the components of the computer 420 in FIG. 4 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 420 can be, or can include, a software module configured for execution by at least one processor (not shown). In some implementations, the functionality of the components can be included in different modules and/or different components than those shown in FIG. 4, including combining functionality illustrated as two components into a single component.

Although not shown, in some implementations, the components of the computer 420 (or portions thereof) can be configured to operate within, for example, a data center (e.g., a cloud computing environment), a computer system, one or more server/host devices, and/or so forth. In some implementations, the components of the computer 420 (or portions thereof) can be configured to operate within a network. Thus, the components of the computer 420 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, the memory 426 can be any type of memory such as a random-access memory, a disk drive memory, flash memory, and/or so forth. In some implementations, the memory 426 can be implemented as more than one memory component (e.g., more than one RAM component or disk drive memory) associated with the components of the computer 420. In some implementations, the memory 426 can be a database memory. In some implementations, the memory 426 can be, or can include, a non-local memory. For example, the memory 426 can be, or can include, a memory shared by multiple devices (not shown). In some implementations, the memory 426 can be associated with a server device (not shown) within a network and configured to serve the components of the computer 420. As illustrated in FIG. 4, the memory 426 is configured to store various data, including targeted UI element data 432 and generative model data 442.

Figure 5:
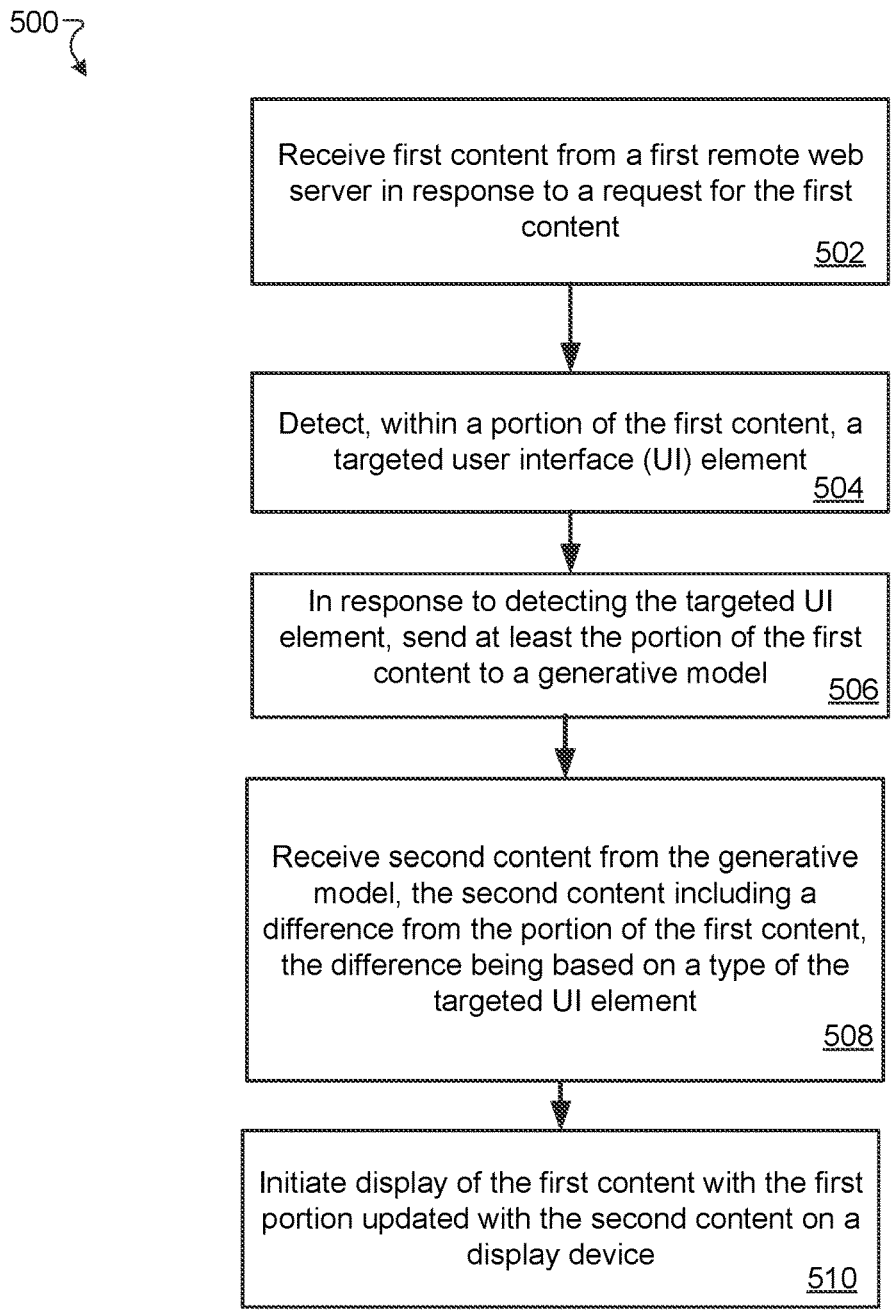
FIG. 5 is a flow chart that illustrates an example method of generating responses to targeted UI elements, according to disclosed implementations.

FIG. 5 is a flow chart depicting an example method 500 of causing responses to targeted UI elements to be generated and displayed on a display device according to the above-described improved techniques. The method 500 may be performed by software constructs described in connection with FIG. 3, which reside in memory 326 of the computer 320 and are run by the set of processing units 324.

At 502, the first content manager 330 receives first content from a first remote web server in response to a request for the first content.

At 504, the targeted UI element manager 340 detects, within a portion of the first content, a targeted UI element. In some implementations, the detection includes determining that words conveying urgency are present in the portion of the first content. In some implementations, the detection is performed using a lookup table (LUT). In some implementations, the detection is performed using a model trained to identify targeted UI elements in content to evaluate the first content.

At 506, the targeted UI element manager 340, in response to detecting the targeted UI element, sends at least the portion of the first content to a generative model. In some implementations, the targeted UI element manager 340 sends at least the portion of the first content to the generative model over a network.

At 508, the second content manager 350 receives second content from the generative model, the second content including a difference from the portion of the first content, the difference being based on a type of the targeted UI element. In some implementations, the type of targeted UI element is a textual element and the difference includes a textual element or a deletion of a textual element. In some implementations, the type of targeted UI element is a graphical element and the difference includes a graphical element or the deletion of a graphical element. In some implementations, the type of targeted UI element is a font, a color, or an emphasis and the difference includes a different font, color, or emphasis. In some implementations, the second content manager 350 performs the detecting in place of the targeted UI element manager 340.

At 510, the render and display manager 360 initiates display of the first content with the portion of the first content updated with the second content on a display device.

Figure 6:
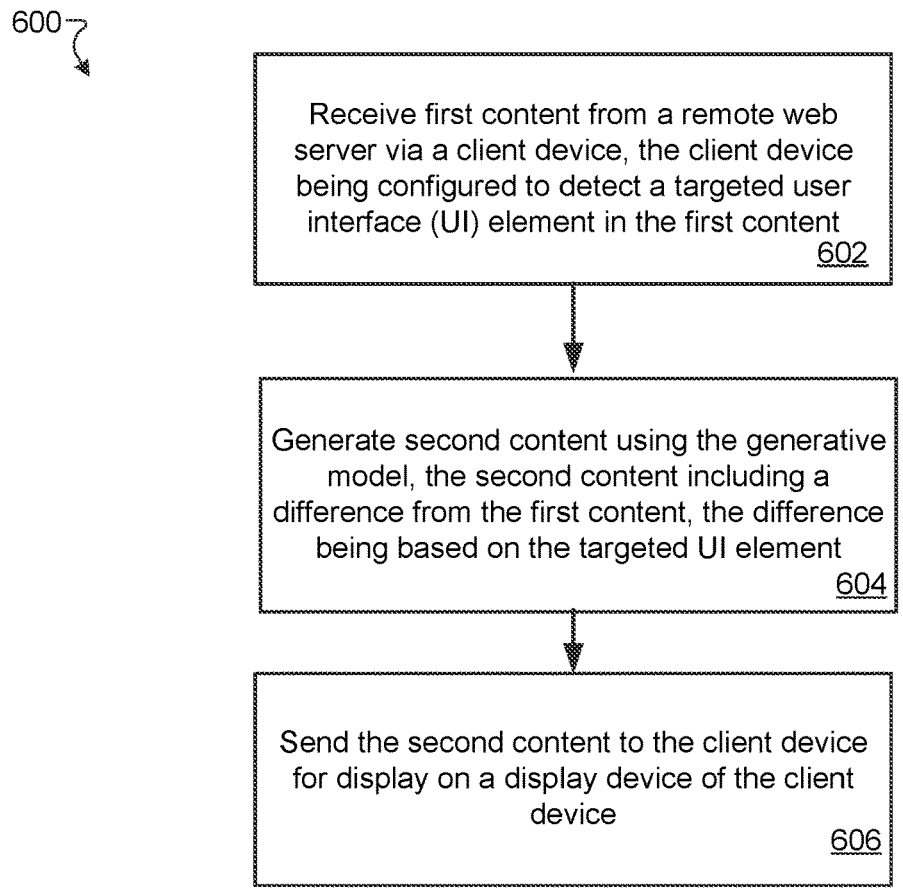
FIG. 6 is a flow chart that illustrates an example method of generating responses to targeted UI elements, according to disclosed implementations.

FIG. 6 is a flow chart depicting an example method 600 of generating responses to targeted UI elements according to the above-described improved techniques. The method 600 may be performed by software constructs described in connection with FIG. 4, which reside in memory 426 of the computer 420 and are run by the set of processing units 424.

At 602, the targeted UI element manager 430 receives first content via a client device, the client device being configured to detect a targeted user interface (UI) element in the first content.

At 604, the generative model manager 440 generates second content using a generative model, the second content including a difference from the first content, the difference being based on the targeted UI element. In some implementations, the detection performed in step 602 can be performed by the generative model manager 440 instead.

At 606, the second content manager 450 sends the second content to the client device for display on a display device of the client device.

Clause 1. A computer program product comprising a nontransitory storage medium, the computer program product including code that, when executed by processing circuitry, causes the processing circuitry to perform a method, the method comprising: receiving first content from a first remote web server in response to a request for the first content; detecting, within a portion of the first content, a targeted user interface (UI) element; in response to detecting the targeted UI element, sending at least the portion of the first content to a generative model; receiving second content from the generative model, the second content including a difference from the portion of the first content, the difference being based on a type of the targeted UI element; and initiating display of the first content with the portion of the first content updated with the second content on a display device.

Clause 2. The computer program product as in clause 1, wherein at least the portion of the first content is sent to a second remote server that includes the generative model.

Clause 3. The computer program product as in any of clause 1 or 2, wherein detecting the targeted UI element includes sending the first content to the generative model, the generative model being trained to identify a targeted UI element.

Clause 4. The computer program product as in clause 3, wherein the generative model is trained to generate the second content and modify the first content by updating the portion of the first content using the second content in response to identifying the targeted UI element, wherein receiving the second content includes receiving the modified first content.

Clause 5. The computer program product as in any of clauses 1 to 4, wherein detecting the targeted UI element includes: providing the first content to a model trained to identify targeted UI elements in content; and receiving a result from the model indicating the portion of the first content includes the targeted UI element.

Clause 6. The computer program product as in any of clauses 1 to 5, wherein the second content includes at least one annotation to the portion of the first content.

Clause 7. The computer program product as in any of clauses 1 to 6, wherein the portion of the first content includes first text and the second content includes second text different from the first text.

Clause 8. The computer program product as in any of clauses 1 to 7, wherein the portion of the first content includes a first color and the second content includes a second color different from the first color.

Clause 9. A computer program product comprising a nontransitory storage medium, the computer program product including code that, when executed by processing circuitry, causes the processing circuitry to perform a method, the method comprising: receiving first content via a client device, the client device being configured to detect a targeted user interface (UI) element in the first content; generating second content using a generative model, the second content including a difference from the first content, the difference being based on the targeted UI element; and sending the second content to the client device for display on a display device of the client device.

Clause 10. The computer program product as in clause 9, wherein the second content includes at least one annotation to the first content.

Clause 11. The computer program product as in any of clauses 9 to 10, wherein the first content includes first text and the second content includes second text different from the first text.

Clause 12. The computer program product as in any of clauses 9 to 11, wherein the first content includes a first color and the second content includes a second color different from the first color.

Clause 13. A method, comprising: receiving first content from a first remote web server in response to a request for the first content; detecting, within a portion of the first content, a targeted user interface (UI) element; in response to detecting the targeted UI element, sending at least the portion of the first content to a generative model; receiving second content from the generative model, the second content including a difference from the portion of the first content, the difference being based on a type of the targeted UI element; and initiating displaying of the first content with the portion of the first content updated with the second content on a display device.

Clause 14. The method as in clause 13, wherein detecting the targeted UI element includes sending the first content to the generative model, the generative model being trained to identify a targeted UI element.

Clause 15. The method as in clause 14, wherein the generative model is trained to generate the second content and modify the first content by updating the portion of the first content using the second content in response to identifying the targeted UI element, wherein receiving the second content includes receiving the modified first content.

Clause 16. The method as in any of clauses 13 to 15, wherein detecting the targeted UI element includes providing the first content to a model trained to identify targeted UI elements in content; and receiving a result from the model indicating the portion of the first content includes the targeted UI element.

Clause 17. The method as in any of clauses 13 to 16, wherein the second content includes at least one annotation to the portion of the first content.

Clause 18. The method as in any of clauses 13 to 17, wherein the portion of the first content includes first text and the second content includes second text different from the first text.

Clause 19. The method as in any of clauses 13 to 18, wherein the portion of the first content includes a first color and the second content includes a second color different from the first color.

Clause 20. An electronic apparatus, the electronic apparatus comprising: memory; and processing circuitry coupled to the memory, the processing circuitry being configured to: receive first content from a first remote web server in response to a request for the first content; detect, within a portion of the first content, a targeted user interface (UI) element; in response to detecting the targeted UI element, send at least the portion of the first content to a generative model; receive second content from the generative model, the second content including a difference from the portion of the first content, the difference being based on a type of targeted UI element; and initiate display of the first content with the portion of the first content updated with the second content on a display device.

Clause 21. The electronic apparatus as in clause 20, wherein at least the portion of the first content is sent to a second remote server that includes the generative model.

Clause 22. The electronic apparatus as in any of clauses 20 to 21, wherein the processing circuitry configured to detect the targeted UI element is further configured to send the first content to the generative model, the generative model being trained to identify a targeted UI element.

Clause 23. The electronic apparatus as in clause 22, wherein the generative model is trained to generate the second content and modify the first content by updating the portion of the first content using the second content in response to identifying the targeted UI element, wherein receiving the second content includes receiving the modified first content.

Clause 24. The electronic apparatus as in any of clauses 20 to 23, wherein the processing circuitry configured to detect the targeted UI element is further configured to: provide the first content to a model trained to identify targeted UI elements in content; and receive a result from the model indicating the portion of the first content includes the targeted UI element.

Clause 25. The electronic apparatus as in any of clauses 20 to 24, wherein the second content includes at least one annotation to the portion of the first content.

Clause 26. The electronic apparatus as in any of clauses 20 to 25, wherein the portion of the first content includes first text and the second content includes second text different from the first text.

Clause 27. The electronic apparatus as in any of clauses 20 to 26, wherein the portion of the first content includes a first color and the second content includes a second color different from the first color.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "nontransitory machine-readable medium" "nontransitory computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite example relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer program product comprising a non-transitory storage medium, the computer program product including code that, when executed by processing circuitry, causes the processing circuitry to perform a method, the method comprising:
   receiving first content from a first remote web server in response to a request for the first content;
   detecting, within a portion of the first content, a targeted user interface (UI) element based on a visual characteristic of the first content;
   in response to detecting the targeted UI element, sending at least the portion of the first content to a generative model;
   receiving second content from the generative model, the second content including a difference from the portion of the first content, the difference being to the visual characteristic of the targeted UI element; and
   initiating display of the first content with the portion of the first content updated with the second content on a display device.

2. The computer program product as in claim 1, wherein at least the portion of the first content is sent to a second remote server that includes the generative model.

3. The computer program product as in claim 1, wherein detecting the targeted UI element includes sending the first content to the generative model, the generative model being trained to identify a targeted UI element.

4. The computer program product as in claim 3, wherein the generative model is trained to generate the second content and modify the first content by updating the portion of the first content using the second content in response to identifying the targeted UI element, wherein receiving the second content includes receiving the modified first content.

5. The computer program product as in claim 1, wherein detecting the targeted UI element includes:
   providing the first content to a model trained to identify targeted UI elements in content; and
   receiving a result from the model indicating the portion of the first content includes the targeted UI element.

6. The computer program product as in claim 1, wherein the second content includes at least one annotation to the portion of the first content.

7. The computer program product as in claim 1, wherein the portion of the first content includes first text and the second content includes second text different from the first text.

8. The computer program product as in claim 1, wherein the portion of the first content includes a first color and the second content includes a second color different from the first color.

9. A method, comprising:
   receiving first content from a first remote web server in response to a request for the first content;
   detecting, within a portion of the first content, a targeted user interface (UI) element based on a visual characteristic of the first content;
   in response to detecting the targeted UI element, sending at least the portion of the first content to a generative model;
   receiving second content from the generative model, the second content including a difference from the portion of the first content, the difference being to the visual characteristic of the targeted UI element; and
   initiating displaying of the first content with the portion of the first content updated with the second content on a display device.

10. The method as in claim 9, wherein detecting the targeted UI element includes sending the first content to the generative model, the generative model being trained to identify a targeted UI element.

11. The method as in claim 10, wherein the generative model is trained to generate the second content and modify the first content by updating the portion of the first content using the second content in response to identifying the targeted UI element, wherein receiving the second content includes receiving the modified first content.

12. The method as in claim 9, wherein detecting the targeted UI element includes:
   providing the first content to a model trained to identify targeted UI elements in content; and
   receiving a result from the model indicating the portion of the first content includes the targeted UI element.

13. The method as in claim 9, wherein the second content includes at least one annotation to the portion of the first content.

14. The method as in claim 9, wherein the portion of the first content includes first text and the second content includes second text different from the first text.

15. The method as in claim 9, wherein the portion of the first content includes a first color and the second content includes a second color different from the first color.

16. An electronic apparatus, the electronic apparatus comprising:
   memory; and
   processing circuitry coupled to the memory, the processing circuitry being configured to:
      receive first content from a first remote web server in response to a request for the first content;
      detect, within a portion of the first content, a targeted user interface (UI) element based on a visual characteristic of the first content;
      in response to detecting the targeted UI element, send at least the portion of the first content to a generative model;
      receive second content from the generative model, the second content including a difference from the portion of the first content, the difference being to the visual characteristic of targeted UI element; and
      initiate display of the first content with the portion of the first content updated with the second content on a display device.

17. The electronic apparatus as in claim 16, wherein at least the portion of the first content is sent to a second remote server that includes the generative model.

18. The electronic apparatus as in claim 16, wherein the processing circuitry configured to detect the targeted UI element is further configured to send the first content to the generative model, the generative model being trained to identify a targeted UI element.

19. The electronic apparatus as in claim 18, wherein the generative model is trained to generate the second content and modify the first content by updating the portion of the first content using the second content in response to identifying the targeted UI element, wherein receiving the second content includes receiving the modified first content.

20. The electronic apparatus as in claim 16, wherein the processing circuitry configured to detect the targeted UI element is further configured to:
   provide the first content to a model trained to identify targeted UI elements in content; and receive a result from the model indicating the portion of the first content includes the targeted UI element.

21. The electronic apparatus as in claim 16, wherein the second content includes at least one annotation to the portion of the first content.

22. The electronic apparatus as in claim 16, wherein the portion of the first content includes first text and the second content includes second text different from the first text.

23. The electronic apparatus as in claim 16, wherein the portion of the first content includes a first color and the second content includes a second color different from the first color.

* * * * *